R. F. WILLCOX.

Treadle for Sewing-Machines.

No. 6,602. Reissued Aug. 17, 1875.

WITNESSES

Henry N. Miller

A. L. Ewerth

By

INVENTOR

Robert F. Willcox

Alexander Mason

Attorney

N. PETERS, PHOTO-LITHOGRAPHER, WASHINGTON, D. C.

UNITED STATES PATENT OFFICE.

ROBERT FRANCIS WILLCOX, OF MEMPHIS, TENNESSEE.

IMPROVEMENT IN TREADLES FOR SEWING-MACHINES.

Specification forming part of Letters Patent No. 155,133, dated September 15, 1874; reissue No. 6,602, dated August 17, 1875; application filed July 19, 1875.

*To all whom it may concern:*

Be it known that I, ROBERT F. WILLCOX, of Memphis, in the county of Shelby and State of Tennessee, have invented certain new and useful Improvements in Hand-Power for Sewing-Machines; and I do hereby declare that the following is a full, clear, and exact description thereof, reference being had to the accompanying drawings, and to the letters of reference marked thereon, which form a part of this specification.

The nature of my invention consists in an attachment to the band-wheels of sewing-machines, whereby the motive power may be changed from treadle to hand-crank, and vice versa, when desired, as will be hereinafter more fully set forth.

In order to enable others skilled in the art to which my invention appertains to make and use the same, I will now proceed to describe its construction and operation, referring to the annexed drawing, in which—

Figure 1:
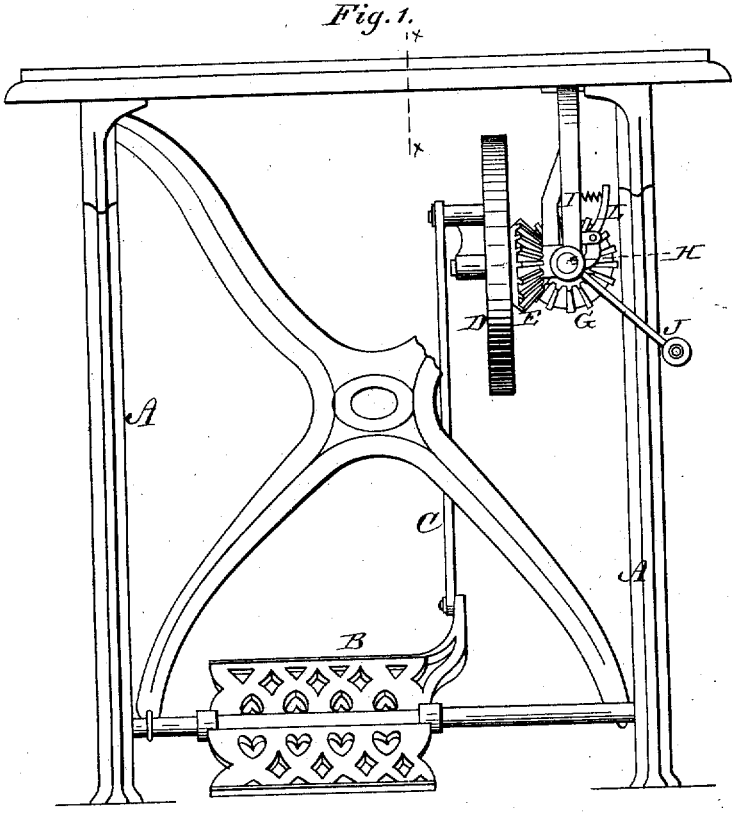
Figure 2:
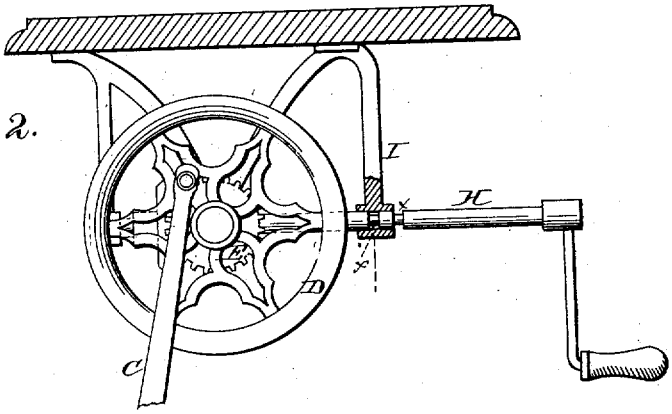
Figure 3:
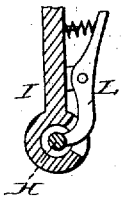

Figure 1 is a front elevation of a sewing-machine embodying my invention. Fig. 2 is a section of the same through the line *x x*, Fig. 1. Fig. 3 is a section, showing the catch for holding the crank attachment in position.

A represents the stand of a sewing-machine. B is the treadle; C, the pitman, and D the band-wheel, all constructed in any of the known and usual ways. On the axis of the band-wheel D is secured a bevel-gear wheel, E, which meshes with a similar wheel, G, on a shaft, H. This shaft has its bearings in suitable hangers I I, attached to the under side of the sewing-machine top, or to the stand, as desired. On the front end of the shaft H is a crank, J.

This device is so arranged that the crank will be placed to the right of the operator at a natural and easy position for the hand and arm—say, about on a level with the lap of the operator while sitting before the machine.

The shaft H can be moved backward and forward in its bearings I I, so as to instantly change from hand to treadle, and vice versa. In either position the shaft is held by means of a spring-catch, L, entering circumferential grooves *x* on the shaft H.

Having thus fully described my invention, what I claim as new, and desire to secure by Letters Patent, is—

1. The adjustable shaft arranged under the table to the right of the operator, having a hand-crank at one end, and provided with a wheel at the other end, which is engaged or disengaged at will from the operative wheel of the machine, so that the movement can be changed from treadle to hand power, or vice versa, substantially as set forth.

2. The combination, with the band-wheel D of a sewing-machine, of wheels E G, adjustable shaft H, and crank J, substantially as and for the purposes herein set forth.

3. The combination of the adjustable shaft H, having circumferential grooves *x x*, and the spring-catch L, as and for the purposes herein set forth.

In testimony that I claim the foregoing I have hereunto set my hand this 10th day of July, 1875.

ROBERT FRANCIS WILLCOX.

Witnesses:

J. D. RADIGAN,

W. R. SIMS.